United States Patent

Re. 28,419
Reissued May 13, 1975

28,419

METHOD OF FABRICATING ALUMINUM ALLOY ROD

Roger J. Schoerner, Carrollton, Ga., assignor to Southwire Company, Carrollton, Ga.

Original No. 3,670,401, dated June 20, 1972, Ser. No. 31,461, Apr. 1, 1970, which is a division of Ser. No. 814,183, Apr. 7, 1969, now Patent No. 3,512,221, which is a continuation-in-part of abandoned application Ser. No. 779,376, Nov. 27, 1968, which is a continuation-in-part of abandoned application Ser. No. 730,933, May 21, 1968. Application for reissue Apr. 29, 1974, Ser. No. 464,922

Int. Cl. B22d *25/00*

U.S. Cl. 148—2 15 Claims

Matter enclosed in heavy brackets [ ] appears in the original patent but forms no part of this reissue specification; matter printed in italics indicates the additions made by reissue.

ABSTRACT OF THE DISCLOSURE

An aluminum alloy wire having an electrical conductivity of at least 61 percent based on the International Annealed Copper Standard and unexpected properties of increased ultimate elongation, bendability and fatigue resistance when compared to conventional aluminum alloy wire of the same tensile strength. The aluminum alloy wire contains substantially evenly distributed iron aluminate inclusions in a concentration produced by the addition of more than about 0.30 weight percent iron to an alloy mass containing less than about 99.70 weight percent aluminum, no more than 0.15 weight percent silicon, and trace quantities of conventional impurities normally found within a commercial aluminum alloy. The substantially evenly distributed iron aluminate inclusions are obtained by continuously casting an alloy consisting essentially of less than about 99.70 weight percent aluminum, more than 0.30 weight percent iron, no more than 0.15 weight percent silicon and trace quantities of typical impurities to form a continuous aluminum alloy bar, hot-working the bar substantially immediately after casting in substantially that condition in which the bar is cast to form continuous rod which is subsequently drawn into wire without intermediate anneals and annealed after the final draw. After annealing, the wire has the aforementioned novel and unexpected properties of increased ultimate elongation, electrical conductivity of at least 61 percent of the International Annealed Copper Standard, and increased bendability and fatigue resistance.

CROSS-REFERENCE TO RELATED APPLICATIONS

This application is a division of copending application Ser. No. 814,183, filed Apr. 7, 1969, now U.S. Pat. No. 3,512,221, which application is a continuation-in-part of copending application Ser. No. 779,376, filed Nov. 27, 1968, now abandoned, which in turn, is a continuation-in-part of copending application Ser. No. 730,933, filed May 21, 1968, and now abandoned.

This invention relates to an aluminum alloy wire suitable for use as an electrical conductor and more particularly concerns an aluminum alloy wire having an acceptable electrical conductivity and improved elongation, bendability and tensile strength.

The use of various aluminum alloy wires (conventionally referred to as EC wire) as conductors of electricity is well established in the art. Such alloys characteristically have conductivities of at least 61 percent of the International Annealed Copper Standard (hereinafter sometimes referred to as IACS) and chemical constituents consisting of a substantial amount of pure aluminum and small amounts of conventional impurities such as silicon, vanadium, iron, copper, manganese, magnesium, zinc, boron and titanium. The physical properties of prior aluminum alloy wire have proven less than desirable in many applications. Generally desirable percent elongations have been obtained only at less than desirable tensile strengths and desirable tensile strengths have been obtainable only at less than desirable percent elongations. In addition, the bendability and fatigue resistance of prior aluminum alloy wires has been so low that the prior wire has been generally unsuitable for many otherwise desirable applications.

Thus, it becomes apparent that a need has arisen within the industry for an aluminum alloy electrically conductive wire which has both improved percent elongation and improved tensile strength, and also possesses an ability to withstand numerous bends at one point and to resist fatiguing during use of the conductor. Therefore, it is an object of the present invention to provide an aluminum alloy wire of acceptable conductivity and improved physical properties such that the conductor may be used in new applications. Another object of the present invention is to provide an aluminum alloy wire having novel properties of increased ultimate elongation and tensile strength, improved bendability and fatigue resistance and acceptable electrical conductivity. These and other objects, features and advantages of the present invention will become apparent to those skilled in the art from a consideration of the following detailed description of the invention.

In accordance with this invention, the present aluminum alloy electrically conductive wire is prepared from an alloy comprising less than about 99.70 weight percent aluminum, more than about 0.30 weight percent iron, and no more than 0.15 weight percent silicon. Preferably, the aluminum content of the present alloy comprises from about 98.95 to less than about 99.45 weight percent with particularly superior results being achieved when from about 99.15 to about 99.40 weight percent aluminum is employed. Preferably, the iron content of the present alloy comprises about 0.45 weight percent to about 0.95 weight percent with particularly superior results being achieved when from about 0.50 weight percent to about 0.80 weight percent iron is employed. Preferably, no more than 0.07 weight percent silicon is employed in the present alloy. The ratio between the percentage iron and the percentage silicon must be 1.99:1 or greater. Preferably, the ratio between percentage iron and percentage silicon is 8:1 or greater. Thus, if the present aluminum alloy contains an amount of iron within the low area of the present range for iron content, the percentage of aluminum must be increased rather than increasing the percentage of silicon outside the ratio limitation previously specified. It has been found that properly processed wire having aluminum alloy constituents which fall within the above-specified ranges possesses acceptable electrical conductivity and improved tensile strength and ultimate elongation and in addition has a novel unexpected property of surprisingly increased bendability and fatigue resistance.

The present aluminum alloy is prepared by initially melting and alloying aluminum with the necessary amounts of iron or other constituents to provide the requisite alloy for processing. Normally, the content of silicon is maintained as low as possible without adding additional amounts to the melt. Typical impurities or trace elements are also present within the melt, but only in trace quantities such as less than 0.05 weight percent each with a total content of trace impurities generally not exceeding 0.15 weight percent. Of course, when adjusting the amounts of trace elements due consideration must be given to the conductivity of the final alloy since some trace elements affect conductivity more severely than others. The typical trace elements include vanadium, copper, manganese, magnesium, zinc, boron and titanium. If the content of titanium is relatively high (but still quite low compared to the aluminum, iron and silicon content), small amounts of boron may be added to tie-up the excess titanium and keep it from reducing the conductivity of the wire.

Iron is the major constituent added to the melt to produce the alloy of the present invention. Normally, about [0.80] *0.50* weight percent is added to the typical aluminum component used to prepare the present alloy. Of course, the scope of the present invention includes the addition of more or less iron together with the adjustment of the content of all alloying constituents.

After alloying, the melted aluminum composition is continuously cast into a continuous bar. The bar is then hot-worked in substantially that condition in which it is received from the casting machine. A typical hot-working operation comprises rolling the bar in a rolling mill substantially immediately after being cast into a bar.

One example of a continuous casting and rolling operation capable of producing continuous rod as specified in this application is as follows:

A continuous casting machine serves as a means for solidifying the molten aluminum alloy metal to provide a cast bar that is conveyed in substantially the condition in which it solidified from the continuous casting machine to the rolling mill, which serves as a means for hot-forming the cast bar into rod or another hot-formed product in a manner which imparts substantial movement to the cast bar along a plurality of angularly disposed axes.

The continuous casting machine is of conventional casting wheel type having a casting wheel with a casting groove partially closed by an endless belt supported by the casting wheel and an idler pulley. The casting wheel and the endless belt cooperate to provide a mold into one end of which molten metal is poured to solidify and from the other end of which the cast bar is emitted in substantially that condition in which it solidified.

The rolling mill is of conventional type having a plurality of roll stands arranged to hot-form the cast bar by a series of deformations. The continuous casting machine and the rolling mill are positioned relative to each other so that the cast bar enters the rolling mill substantially immediately after solidification and in substantially that condition in which it solidified. In this condition, the cast bar is at a hot-forming temperature within the range of temperatures for hot-forming the cast bar at the initiation of hot-forming without heating between the casting machine and the rolling mill. In the event that it is desired to closely control the hot-forming temperature of the cast bar within the conventional range of hot-forming temperatures, means for adjusting the temperature of the cast bar may be placed between the continuous casting machine and the rolling mill without departing from the inventive concept disclosed herein.

The roll stands each include a plurality of rolls which engage the cast bar. The rolls of each roll stand may be two or more in number and arranged diametrically opposite from one another or arranged at equally spaced positions about the axis of movement of the cast bar through the rolling mill. The rolls of each roll stand of the rolling mill are rotated at a predetermined speed by a power means such as as one or more electric motors and the casting wheel is rotated at a speed generally determined by its operating characteristics. The rolling mill serves to hot-form the cast bar into a rod of a cross-sectional area substantially less than that of the cast bar as it enters the rolling mill.

The peripheral surfaces of the rolls of adjacent roll stands in the rolling mill change in configuration; that is, the cast bar is engaged by the rolls of successive roll stands with surfaces of varying configuration, and from different directions. This varying surface engagement of the cast bar in the roll stands functions to knead or shape the metal in the cast bar in such a manner that it is worked at each roll stand and also to simultaneously reduce and change the cross-sectional area of the cast bar into that of the rod.

As each roll stand engages the cast bar, it is desirable that the cast bar be received with sufficient volume per unit of time at the roll stand for the cast bar to generally fill the space defined by the rolls of the roll stand so that the rolls will be effective to work the metal in the cast bar. However, it is also desirable that the space defined by the rolls of each roll stand not be overfilled so that the cast bar will not be forced into the gaps between the rolls. Thus, it is desirable that the rod be fed toward each roll stand at a volume per unit of time which is sufficient to fill, but not overfill, the space defined by the rolls of the roll stand.

As the cast bar is received from the continuous casting machine, it usually has one large flat surface corresponding to the surface of the endless band and inwardly tapered side surfaces corresponding to the shape of the groove in the casting wheel. As the cast bar is compressed by the rolls of the roll stands, the cast bar is deformed so that it generally takes the cross-sectional shape defined by the adjacent peripheries of the rolls of each roll stand.

Thus, it will be understood that with this apparatus, cast aluminum alloy rod of an infinite number of different lengths is prepared by simultaneous casting of the molten aluminum alloy and hot-forming or rolling the cast aluminum bar.

The continuous rod produced by the casting and rolling operation is then processed in a reduction operation designed to produce continuous wire of various gauges. The unannealed rod (i.e., as rolled to f temper) is cold-drawn through a series of progressively constricted dies, without intermediate anneals, to form a continuous wire of desired diameter. At the conclusion of this drawing operation, the alloy wire will have an excessively high tensile strength and an unacceptably low ultimate elongation, plus a conductivity below that which is industry accepted as the minimum for an electrical conductor, i.e., 61 percent of IACS. The wire is then annealed or partially annealed to obtain a desired tensile strength and cooled. At the conclusion of the annealing operation, it is found that the annealed alloy wire has the properties of acceptable conductivity and improved tensile strength together with unexpectedly improved percent ultimate elongation and surprisingly increased bendability and fatigue resistance as specified previously in this application. The annealing operation may be continuous as in resistance annealing, induction annealing, convection annealing by continuous furnaces or radiation annealing by continuous furnaces, or, preferably, may be batch annealed in a batch furnace. When continuously annealing, temperatures of about 450° to about 1,200° F. may be employed with annealing times of about 5 minutes to about one ten-thousandths of a minute. Generally, however, continuous annealing temperatures and times may be adjusted to meet the requirements of the particular overall processing operation so long as the desired tensile strength is achieved. In a batch annealing operation, a temperature of approximately 400° to about 750° F. is employed with residence times of about 30 minutes to about 24 hours. As mentioned with respect to continuous annealing, in batch annealing the times and temperatures may be varied to suit the overall process so long as the desired tensile strength is obtained. Simply by way of example, it has been found that the following tensile strengths in the present aluminum wire are achieved with the listed batch annealing temperatures and times.

TABLE I

| Tensile strength | Temperature | Time |
|---|---|---|
| 12,000 to 14,000 | 650° F | 3 hours. |
| 14,000 to 15,000 | 550° F | Do. |
| 15,000 to 17,000 | 520° F | Do. |
| 17,000 to 22,000 | 480° F | Do. |

During the continuous casting of this alloy, a substantial portion of the iron present in the alloy precipitates out of solution as iron aluminate intermetallic compound ($FeAl_3$). Thus, after casting, the bar contains a dispersion of $FeAl_3$ in a supersaturated solid solution matrix. The supersaturated matrix may contain as much as 0.17 weight percent iron. As the bar is rolled in a hot-working operation immediately after casting, the $FeAl_3$ particles are broken up and dispersed throughout the matrix inhibiting large cell formation. When the rod is then drawn to its final guage size without intermediate anneals and then aged in a final annealing operation, the tensile strength, elongation and bendability are increased due to the small cell size and the additional pinning of dislocations by preferential precipitation of $FeAl_3$ on the dislocation sites. Therefore, new dislocation sources must be activated under the applied stress of the drawing operation and this causes both the strength and the elongation to be further improved.

The properties of the present aluminum alloy wire are significantly affected by the size of the $FeAl_3$ particles in the matrix. Coarse precipitates reduce the percent elongation and bendability of the wire by enhancing nucleation and thus, formation of large cells which, in turn, lowers the recrystallization temperature of the wire. Fine precipitates improve the percent elongation and bendability by reducing nucleation and increasing the recrystallization temperature. Grossly coarse precipitates of $FeAl_3$ cause the wire to become brittle and generally unusable. Coarse precipitates have a particle size of below 2,000 angstrom units.

A typical alloy No. 12 AWG wire of the present invention has physical properties of 15,000 p.s.i. tensile strength, ultimate elongation of 20 percent, conductivity of 61 percent IACS, and bendability of 20 bends to break. Ranges of physical properties generally provided by No. 12 AWG wire prepared from the present alloy include tensile strengths of about 12,000 to about 22,000 p.s.i., ultimate elongations of about 40 to about 5 percent, conductivities of about 61 to about 63 percent and number of bends to break of about 45 to 10.

A more complete understanding of the invention will be obtained from the following examples.

EXAMPLE NO. 1

A comparison between prior EC aluminum alloy wire and the present aluminum alloy wire is provided by preparing a prior EC alloy with aluminum content of 99.73 weight percent, iron content of 0.18 weight percent, silicon content of 0.059 weight percent, and trace amounts of typical impurities. The present alloy is prepared with aluminum content of 99.45 weight percent, iron content of 0.45 weight percent, silicon content of 0.056 weight percent, and trace amounts of typical impurities. Both alloys are continuously cast into continuous bars and hot-rolled into continuous rod in similar fashion. The alloys are then cold-drawn through successively constricted dies to yield No. 12 AWG continuous wire. Sections of the wire are collected on separate bobbins and batch furnace-annealed at various temperatures and for various lengths of time to yield sections of the prior EC alloy and the present alloy of varying tensile strengths. Several samples of each section are tested in a device designed to measure the number of bends required to break each sample at a particular flexure point. Through uniform force and tension, the device fatigues each sample through an arc of approximately 135°. The wire is bent across a pair of spaced opposed mandrels having a diameter equal to that of the wire. The mandrels are spaced apart a distance of about 1½ times the diameter of the wire. One bend is recorded after the wire is deflected from a vertical disposition to one extreme of the arc, returned back to vertical, deflected to the opposite extreme of the arc, and returned back to the original vertical disposition. The speed of deflection, force and tension are substantially equal for all tested samples. The results are as follows:

TABLE IIA

| EC alloy | | Present alloy | |
|---|---|---|---|
| Tensile strength | No. of bends to break | Tensile strength | Average No. of bends to break |
| 10,083 | 43½ | 13,500 | 44 |
| 12,788 | 24 | 14,300 | 43 |
| 13,480 | 21½ | 15,100 | 36 |
| 14,168 | 14 | 16,025 | 29½ |
| 15,200 | 13¾ | 17,050 | 25 |
| 16,100 | 11 | 17,134 | 18 |
| 17,125 | 9¾ | 18,253 | 14 |
| 18,186 | 8¾ | 19,571 | 13 |
| 23,069 | 5½ | 25,286 | 4¾ |
| 29,309 | 4 | 35,986 | 3½ |

As shown in Table IIA, the present alloy has a surprisingly improved property of bendability over conventional EC alloy.

Several samples of the present alloy No. 12 AWG wire and EC alloy No. 12 AWG wire, processed as previously specified, are then tested for percent ultimate elongation by standard testing procedures. At the instant of breakage, the increase in length of the wire is measured. The percent ultimate elongation is then figured by dividing the initial length of the wire sample into the increase in length of the wire sample. The tensile strength of the wire sample is recorded as the pounds per square inch of cross-sectional diameter required to break the wire during the percent ultimate elongation test. The results are as follows:

TABLE IIB

| EC alloy | | Present alloy | |
|---|---|---|---|
| Tensile strength | Percent ultimate elongation | Tensile strength | Percent ultimate elongation |
| | | 13,500 | 30.8 |
| 10,000 | 30.5 | 14,300 | 30 |
| 12,700 | 21 | 15,525 | 24 |
| 13,500 | 14 | 16,150 | 19 |
| 14,200 | 11.5 | 16,550 | 16 |
| 15,000 | 8 | 17,200 | 13.2 |
| 16,500 | 3.5 | 18,270 | 8.6 |
| 18,300 | 2 | 19,000 | 6.7 |

As shown in Table IIB, the present alloy has a surprisingly improved property of percent ultimate elongation over conventional EC alloy.

EXAMPLES 2 THROUGH 7

Six aluminum alloys are prepared with varying amounts of major constituents. Those alloys are reported in the following table:

TABLE III

| | Percent | | |
|---|---|---|---|
| Example No. | Al | Fe | Si |
| 2 | 99.73 | 0.180 | 0.059 |
| 3 | 99.52 | 0.385 | 0.063 |
| 4 | 99.46 | 0.450 | 0.056 |
| 5 | 99.36 | 0.540 | 0.064 |
| 6 | 99.275 | 0.650 | 0.015 |
| 7 | 99.20 | 0.750 | 0.030 |

The six alloys are then cast into six continuous bars and hot-rolled into six continuous rods. The rods are cold-drawn through successively constricted dies to yield No. 12 gauge wire. The wire produced from the alloys of examples No. 2 and 4 are resistance annealed and the remainder of the examples are batch furnace annealed to yield the tensile strengths reported in Table IV. After annealing, each of the wires is tested for percent conductivity, tensile strength, percent ultimate elongation and average number of bends to break by standard testing procedures for each, except that the procedure specified in Example No. 1 is used for determining average number of bends to break. These results are reported in the following table.

TABLE IV

| Example No. | Conductivity in percent IACS | Tensile strength | Percent ultimate elongation | Average No. of bends to break |
|---|---|---|---|---|
| 2 | 62.8 | 15,150 | 8.1 | 15½ |
| 3 | 61.3 | 15,153 | 28.0 | 27½ |
| 4 | 61.5 | 15,152 | 37.5 | 28 |
| 5 | 61.5 | 15,152 | 35.0 | 28½ |
| 6 | 61.25 | 14,300 | 28.0 | 32 |
| 7 | 61.2 | 15,800 | 25 | 28 |

From a review of these results, it may be seen that Example No. 2 falls outside the scope of the present invention in percentage of components. In addition, it will be noted for Example No. 2 that the percentage of ultimate elongation is somewhat lower than desirable and the average number of bends to break the sample is lower than the remaining examples.

EXAMPLE NO. 8

An aluminum alloy is prepared with an aluminum content of 99.42 weight percent, iron content of 0.50 weight percent, silicon content of 0.055 weight percent and trace amounts of typical impurities. The alloy is cast into a continuous bar which is hot-rolled to yield a continuous rod. The rod is then cold-drawn through successively constricted dies to yield No. 12 AWG wire. The wire is collected on a 30 inch bobbin until the collected wire weighs approximately 250 pounds. The bobbin is then placed in a cold General Electric Bell Furnace and the temperature therein is raised to 480° F. The temperature of the furnace is held at 480° F. for 3 hours after which the heat is terminated and the furnace cools to 400° F. The furnace is then quick cooled and the bobbin is removed. Under testing, it is found that the alloy wire has a conductivity of 61.6 percent IACS, a tensile strength of 16,500 p.s.i., a percentage of ultimate elongation of 20 percent, and a number of bends to break of 18.

EXAMPLE NO. 9

Example 8 is repeated except the Bell Furnace temperature is raised to 500° F. and held for 3 hours prior to cooling. The annealed alloy wire has a conductivity of 61.4% IACS, a tensile strength of 15,000 p.s.i., a percentage of ultimate elongation of 27 percent, and a number of bends to break of 28.

EXAMPLE NO. 10

Example No. 8 is repeated except the Bell Furnace temperature is raised to 600° F. and held for three hours prior to cooling. The annealed alloy wire has a conductivity of 61.2 percent IACS, a tensile strength of 14,000 p.s.i., a percentage of elongation of 30 percent, and a number of bends to break of 43.

EXAMPLE NO. 11

Example No. 8 is repeated except the Bell Furnace temperature is raised to 600° F. and held 1½ hours prior to cooling. The annealed alloy has a conductivity of 61.5 percent IACS, a tensile strength of 16,000 p.s.i., a percentage of elongation of 22 percent, and a number of bends to break of 23.

EXAMPLE NO. 12

The alloy of Example No. 8 is cast into a continuous bar which is hot-rolled to yield a continuous f temper rod of ⅜ inch diameter. The rod is then cold-drawn through successively constricted dies to yield No. 14 AWG wire. The wire is then redrawn on a Synchro Model BG-16 wire drawing machine which includes a Synchro Resistioneal continuous in line annealer. The wire is drawn to No. 28 AWG at a finishing speed of 3,300 feet per minute and the in line annealer is operated at 52 volts with a transformer tap setting at No. 8. The annealed alloy wire has a conductivity of 62 percent IACS, a tensile strength of 15,450 p.s.i., and a percentage of ultimate elongation of 25 percent. Since the wire gauge is so small, the number of bends to break is extremely large.

EXAMPLE NO. 13

The alloy of Example No. 8 is cast into a continuous bar which is hot-rolled to yield a continuous f temper rod of ⅜ inch diameter. The rod is then cold-drawn on a Synchro Style No. FX 13 wire drawing machine which includes a continuous in line annealer. The rod is drawn to No. 12 AWG wire at a finishing speed of 2,000 feet per minute and the in line annealer voltage at preheater No. 1 is 35 volts, at preheater No. 2 is 35 volts, and at the annealer is 22 volts. The three transformer taps are set at No. 5. The annealed alloy wire has a conductivity of 62 percent IACS, a tensile strength of 16,300 p.s.i., and a percentage of ultimate elongation of 20 percent.

For the purpose of clarity, the following terminology used in this application is explained as follows:

Rod—A solid product that is long in relation to its cross-section. Rod normally has a cross-section of between 3 inches and 0.375 inch.

Wire—A solid wrought product that is long in relation to its cross-section, which is square or rectangular with sharp or rounded corners or edges, or is round, a regular hexagon or a regular octagon, and whose diameter or greatest perpendicular distance between parallel faces is between 0.374 inches and 0.0031 inch.

While this invention has been described in detail with particular reference to preferred embodiments thereof, it will be understood that variations and modifications can be effected within the spirit and scope of the invention as described hereinbefore and as defined in the appended claims.

I claim:

1. Process for preparing an aluminum alloy wire having an electrical conductivity of at least 61 percent IACS and iron aluminate inclusions with a particle size of less than 2,000 angstrom units comprising the steps of:

a. Alloying from about 98.95 to [about 99.54] *less than 99.45* weight percent aluminum, from about 0.45 to about 0.95 weight percent iron, about [0.01] *0.015* to about 0.15 weight percent silicon, and [less] *trace quantities of no more* than 0.05 weight percent each of trace elements selected from the group consisting of vanadium, copper, *magnesium,* manganese, zinc, boron and titanium; the total weight percent of trace elements being no more than 0.15 weight percent; [and the ratio of iron to silicon being at least 8:1;]

b. Casting the alloy into a continuous bar in a moving mold formed by a groove in the periphery of a casting wheel and an endless belt lying adjacent the groove along a portion of the periphery of the wheel;

c. Hot-working the bar substantially immediately after casting while the bar is in substantially that condition as cast by rolling the bar in closed roll passes to obtain a continuous aluminum alloy rod;

d. Drawing the rod with no preliminary or intermediate anneals to form wire *having a conductivity of less than 61 percent IACS;* and e. Annealing or partially annealing the wire.

2. Process of claim 1 wherein step (a) comprises alloying from about 98.95 to [about 99.44] *less than about 99.45* weight percent aluminum, about [0.55] *0.54* to about 0.95 weight percent iron, from about [0.01] *0.015* to about 0.15 weight percent silicon, and [less] *trace quantities of no more* than 0.05 weight percent each of trace elements selected from the group consisting of vanadium, copper, *magnesium,* manganese, zinc, boron and titanium.

3. Process of claim 1 wherein the individual trace element content is from 0.0001 to 0.05 weight percent and the total trace element content is from 0.004 to 0.15 weight percent.

4. Process of claim 1 wherein step (e) comprises batch annealing or batch partially annealing the wire.

5. Process for preparing an aluminum alloy wire having an electrical conductivity of at least 61 percent IACS comprising the steps of:

a. Alloying from about 98.95 to [about 99.54] *less than 99.45* weight percent aluminum with about 0.45 to about 0.95 weight percent iron, about [0.01] *0.015* to about 0.15 weight percent silicon, and [from 0.0001 to] *trace quantities of no more than* 0.05 weight percent each of trace elements selected from the group consisting of vanadium, copper, *magnesium,* manganese, zinc, boron and titanium, the total trace element content being [from 0.004 to] *no more than* 0.15 weight percent.

b. Continuously casting the alloy into a continuous bar;

c. Continuously rolling the bar in substantially that condition in which it was cast into a bar to form a continuous rod;

d. Drawing the rod with no preliminary or intermediate anneals to form wire *having a conductivity of less than 61 percent IACS;* and [e. Annealing or partially annealing the wire.]

*e. Annealing or partially annealing the wire.*

6. Process of claim [20] *5* wherein step (a) comprises alloying from about 98.95 to *less than* [99.44] *99.45* weight percent aluminum, about [0.55] *0.54* to about 0.95 weight percent iron, from about [0.01] *0.015* to about 0.15 weight percent silicon, and from 0.0001 to 0.05 weight percent each of trace elements selected from the group consisting of vanadium, copper, *magnesium,* manganese, zinc, boron and titanium, the total trace element content being from 0.004 to 0.15 weight percent.

7. Process for preparing an aluminum alloy rod *for subsequent use in the preparation of an aluminum alloy wire having a minimum conductivity of 61% IACS* comprising the steps of:

a. Alloying from about 98.95 to [about 99.54] *less than 99.45* weight percent aluminum, from about 0.45 to about 0.95 weight percent iron, about [0.01] *0.015* to about 0.15 weight percent silicon, and [from 0.0001 to] *trace quantities of no more than* 0.05 weight percent each of trace elements selected from the group consisting of vanadium, copper, *magnesium,* manganese, zinc, boron and titanium; the total weight percent of trace elements being [from 0.004 to] *no more than* 0.15 weight percent; [and the ratio of iron to silicon being at least 8:1;]

b. Casting the alloy into a continuous bar in a moving mold formed by a groove in the periphery of a casting wheel and an endless belt lying adjacent the groove along a portion of the periphery of the wheel; and c. *Without any preliminary or intermediate anneals,* [Hot] *hot*-working the bar substantially immediately after casting while the bar is in substantially that condition as cast by rolling the bar in closed roll passes to obtain a continuous aluminum alloy rod [without having been subjected to any preliminary or intermediate anneals] *having a conductivity of less than 61% IACS.*

8. Process of claim 7 wherein step (a) comprises alloying from about 98.95 to [about 99.44] *less than 99.45* weight percent aluminum, about [0.55] *0.54* to about 0.95 weight percent iron, from about [0.01] *0.015* to about 0.15 weight percent silicon, and from 0.0001 to 0.05 weight percent each of trace elements selected from the group consisting of vanadium, copper, *magnesium,* manganese, zinc, boron and titanium, the total trace element content being from 0.004 to 0.15 weight percent.

9. Process for preparing an aluminum alloy wire having an electrical conductivity of at least 61 percent IACS and iron aluminate inclusions with a particle size of less than 2,000 angstrom units comprising the steps of:

a. Alloying from about 98.95 to [about 99.54] *less than 99.45* weight percent aluminum, from about 0.45 to about 0.95 weight percent iron, about [0.01] *0.015* to about 0.15 weight percent silicon, and [less] *trace quantities of no more* than 0.05 weight percent each of trace elements selected from the group consisting of vanadium, copper, *magnesium,* manganese, zinc, boron and titanium; the total weight percent of trace elements being no more than 0.15 weight percent; [and the ratio of iron to silicon being at least 8:1;]

b. Casting the alloy to form a cast bar;

c. Hot-working the bar by rolling the bar in closed roll passes to obtain an aluminum alloy rod;

d. Drawing the rod with no preliminary or intermediate anneals to form wire *having a conductivity of less than 61% IACS*; and e. Annealing or partially annealing the wire.

10. Process for preparing an aluminum alloy wire having an electrical conductivity of at least 61 percent IACS comprising the steps of:

a. Alloying from about 98.95 to less than [99.44] *99.45* weight percent aluminum with about [0.55] *0.45* to about 0.95 weight percent iron, about [0.01] *0.015* to about 0.15 weight percent silicon, and [from 0.0001 to] *trace quantities of no more than* 0.05 weight percent each of trace elements selected from the group consisting of vanadium, copper, *magnesium,* manganese, zinc, boron and titanium, the total trace element content being [from 0.004 to] *no more than* 0.15 weight percent.

b. Casting the alloy into a cast bar;

c. Hot-rolling the bar to form a rod;

d. Drawing the rod with no preliminary or intermediate anneals to form wire *having a conductivity of less than 61% IACS*; and e. Annealing or partially annealing the wire.

11. Process for preparing an aluminum alloy rod *for subsequent use in the preparation of an aluminum alloy wire having a minimum conductivity of 61% IACS* comprising the steps of:

a. Alloying from about 98.95 to [about 99.54] *less than 99.45* weight percent aluminum, from about 0.45 to about 0.95 weight percent iron, about 0.015 to about 0.15 weight percent silicon, and [from about 0.0001 to] *trace quantities of no more than* 0.05 weight percent each of trace elements selected from the group consisting of vanadium, copper, *magnesium,* manganese, zinc, boron and titanium; the total weight percent of trace elements being [from 0.004 to] *no more than* 0.15 weight percent; [and the ratio of iron content of silicon content being at least 8:1;]

b. continuous casting the alloy to form a continuous cast bar; and [without any preliminary or intermediate anneals initiating hot working the cast bar to form an aluminum alloy rod before the cast bar has cooled to a temperature below its hot working temperature.]

*c. without any preliminary or intermediate anneals, initiating hot working the cast bar to form an aluminum alloy rod having a conductivity of less than 61% IACS, said initiating beginning before the cast bar has cooled to a temperature below its hot working temperature.*

12. Process for preparing an aluminum alloy wire having substantially evenly distributed iron aluminate inclusions of a particle size of less than 2,000 angstrom units and an electrical conductivity of at least 61 percent IACS comprising the steps of:

a. Alloying less than about 99.70 weight percent aluminum with more than about 0.30 weight percent iron, [no more than] *0.015 to* about 0.15 weight percent silicon, and trace quantities of impurities;

b. Casting the alloy into a bar;

c. [Rolling] *Hot-rolling* the bar to form rod;

d. Drawing the rod with no preliminary or intermediate anneals to form wire *having a conductivity of less than 61% IACS*; and e. Annealing or partially annealing the wire *by batch annealing at a temperature of 400° F. to 750° F. for a time of 24 hours to 30 minutes or continuous annealing at a temperature of 450° F. to 1200° F. for a time of 5 minutes to one ten thousandth of a minute to obtain wire having substantially evenly distributed iron aluminate inclusions of a particle size of less than 2,000 angstrom units and a conductivity of at least 61% IACS.*

13. Process for preparing an aluminum alloy wire having substantially evenly distributed iron aluminate inclusions of a particle size of less than 2,000 angstrom units and an electrical conductivity of at least 61 percent IACS comprising the steps of:

a. Alloying less than about 99.70 weight percent aluminum with more than about 0.30 weight percent iron, [no more than] *0.015 to* about 0.15 weight percent silicon, and trace quantities of impurities;

b. Continuously casting the alloy into a continuous bar;

c. Continuously rolling the bar in substantially that condition in which it was cast into a bar to form a continuous rod;

d. Drawing the rod with no preliminary or intermediate anneals to form wire *having a conductivity of less than 61% IACS*; and e. Annealing or partially annealing the wire.

*14. Process for preparing an aluminum alloy wire having an electrical conductivity of at least 61% IACS comprising the steps of:*

*a. Alloying from about 0.30 to about 0.95 weight percent iron, about 0.015 to about 0.15 weight percent silicon, and conventional impurities with from about 98.95 to less than 99.70 weight percent aluminum;*

*b. Casting the alloy into a bar;*

*c. Hot-rolling the bar to form rod before the bar has cooled to a temperature below its hot-rolling temperature;*

*d. Drawing the rod with no preliminary or intermediate anneals to form wire having a conductivity of less than 61% IACS; and*

*e. Annealing or partially annealing the wire by batch annealing at a temperature of 400° F. to 750° F. for a time of 24 hours to 30 minutes or continuous annealing at a temperature of 450° F. to 1200° F. for a time of 5 minutes to one ten thousandth of a minute to obtain wire having substantially evenly distributed iron aluminate inclusions of a particle size of less than 2,000 angstrom units and a conductivity of at least 61% IACS.*

*15. Process for preparing an aluminum alloy wire having an electrical conductivity of at least 61% IACS comprising the steps of:*

*a. Alloying from about 0.30 to about 0.95 weight percent iron, about 0.015 to about 0.15 weight percent silicon, and conventional impurities with from about 98.95 to less than 99.70 weight percent aluminum;*

*b. Continuously casting the alloy into a continuous bar;*

*c. Continuously rolling the bar in substantially that condition in which it was cast into a bar to form a continuous rod;*

*d. Drawing the rod with no preliminary or intermediate anneals to form wire having a conductivity of less than 61% IACS; and*

*e. Annealing or partially annealing the wire to obtain wire having substantially evenly distributed iron aluminate inclusions of a particle size of less than 2,000 angstrom units and a conductivity of at least 61% IACS.*

References Cited

The following references, cited by the Examiner, are of record in the patented file of this patent or the original patent.

UNITED STATES PATENTS

| | | | |
|---|---|---|---|
| Re. 28,085 | 7/1974 | Schoerner | 164—76 |
| 2,545,866 | 3/1951 | Whitzel et al. | 29—193 |
| 3,063,832 | 11/1962 | Snyder et al. | 75—138 |
| 3,241,953 | 3/1966 | Pryor et al. | 75—138 |
| 3,278,300 | 10/1966 | Kichizo Koike | 75—138 |
| 3,397,044 | 8/1968 | Bylund | 29—527.7 X |
| 3,571,910 | 3/1971 | Bylund | 29—527.7 |
| 3,763,686 | 10/1973 | Besel et al. | 72—364 |

FOREIGN PATENTS

| | | | |
|---|---|---|---|
| 776,622 | 1/1968 | Canada | 148—32 |

OTHER REFERENCES

A. J. Field.: "The Electrical Conductivity of Aluminum Wire," *J. Inst. Metals*, vol. 51, pp. 183–198 (1933).

H. J. Miller: "Heat-Treatment and Finishing Operations in the Production of Copper and Aluminum Rod and Wire," *J. Inst. Metals*, vol. 83, pp. 221–232 (1954–5).

G. Gauthier: "The Conductivity of Super-Purity Aluminum: The Influence of Small Metallic Additions," *J. Inst. Metals*, vol. 59, pp. 129–150 (1936).

Ya. M. Kurpotkin et al.: "Effect of Small Impurities of Iron, Nickel and Cobalt of the Mechanical Properties and Electrical Conductivity of Aluminum," Izv. Vysshikh Uchelon, Zavedenii, Energ. 8, No. 10, pp. 112–116 (1965).

R. K. Vassel: "Variation of Certain Properties of Aluminum Conducting Wires With the Manufacturing Technology," Fémipari Kutató Intézel Közleményei, April 1960, pp. 221–245.

A. Domony: "Aluminum for Electrical Conductors," *Light Metals*, November 1949, pp. 614–626.

R. Harrington: "The Effects of Single Addition Metals on the Recrystallization, Electrical Conductivity and Rupture and Rupture Strength of Pure Aluminum," TASM, vol. 41, pp. 443–459 (1949).

Mawawo Kuroda: *Scientific Papers of the Institute of Physical and Chemical Research* (Supplement) No. 14 (September 1931).

C. Panseri et al.: *Allumino*, vol. 29 (1960), pp. 231–239.

"Aluminum for Electrical Conductors," *Light Metals* (November 1949), pp. 614–626.

P. Eversheim: "Investigations of the Electrical Conductivity of Aluminum," Aluminum (July/August 1955), pp. 338–341.

CHARLES W. LANHAM, Primary Examiner

D. C. REILEY III, Assistant Examiner

U.S. Cl. X.R.

29—527.7, Dig. 11

UNITED STATES PATENT OFFICE

CERTIFICATE OF CORRECTION

Patent No. RE. No. 28,419 Dated May 13, 1975

Inventor(s) Roger J. Schoerner

It is certified that error appears in the above-identified patent and that said Letters Patent are hereby corrected as shown below:

Column 5, lines 39 and 40 should read -- precipitates have a particle size of above 2,000 angstrom units and fine precipitates have a particle size of below 2,000 angstrom units. --.

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*

Disclaimer

Re. 28,419.—*Roger J. Schoerner*, Carrollton, Ga. METHOD OF FABRICATING ALUMINUM ALLOY ROD. Patent dated May 13, 1975. Disclaimer filed Mar. 17, 1983, by the assignee, *Southwire Co.*

Hereby enters this disclaimer to claims 12, 13, 14 and 15 of said patent.

[*Official Gazette May 24, 1983.*]